US012748031B2

(12) United States Patent
Patel et al.

(10) Patent No.: US 12,748,031 B2
(45) Date of Patent: Sep. 29, 2026

(54) FLUID INSPECTION APPARATUS

(71) Applicant: INNOVATIVE HEATING SOLUTIONS LIMITED, London (GB)

(72) Inventors: Kavita Patel, St Albans (GB); Charnjit Singh Bath, Hayes (GB)

(73) Assignee: INNOVATIVE HEATING SOLUTIONS LIMITED, London (GB)

(*) Notice: Subject to any disclaimer, the term of this patent is extended or adjusted under 35 U.S.C. 154(b) by 195 days.

(21) Appl. No.: 18/647,693

(22) Filed: Apr. 26, 2024

(65) Prior Publication Data

US 2024/0361223 A1 Oct. 31, 2024

(30) Foreign Application Priority Data

Apr. 27, 2023 (GB) ..................................... 2306236

(51) Int. Cl.

| | |
|---|---|
| ***G01N 15/06*** | (2024.01) |
| ***G01N 1/22*** | (2006.01) |
| ***G01N 15/00*** | (2024.01) |
| ***G01N 15/075*** | (2024.01) |
| ***G01N 21/78*** | (2006.01) |

(52) U.S. Cl.

CPC ..... *G01N 15/0656* (2013.01); *G01N 15/0606* (2013.01); *G01N 15/075* (2024.01); *G01N 2015/0053* (2013.01)

(58) Field of Classification Search

CPC ...... G01N 15/00; G01N 15/06; G01N 15/075; G01N 1/22; G01N 21/78

See application file for complete search history.

(56) References Cited

U.S. PATENT DOCUMENTS

| | | | |
|---|---|---|---|
| 5,261,546 | A | 11/1993 | Van Der Grift |
| 5,540,089 | A | 7/1996 | Fitch |
| 5,852,937 | A | 12/1998 | Westermeyer |
| 8,293,089 | B1 | 10/2012 | James |

(Continued)

FOREIGN PATENT DOCUMENTS

| | | | |
|---|---|---|---|
| CN | 115372360 | A | 11/2022 |
| EP | 3845287 | A1 | 7/2021 |

(Continued)

OTHER PUBLICATIONS

Combined Search and Examination Report of the Intellectual Property Office cited in corresponding British patent application No. GB2306236.7; Jun. 16, 2023; 8 pp.

(Continued)

*Primary Examiner* — Neel D Shah

(74) *Attorney, Agent, or Firm* — Lempia Summerfield Katz LLC

(57) ABSTRACT

A fluid inspection apparatus configured to define an inspection section of a fluid flow passage of a system. The fluid inspection apparatus includes a body element having a wall that defines the inspection section, a flow inlet to the inspection section, and a flow outlet from the inspection section. The inspection section defines a flow path between the flow inlet and the flow outlet. The fluid inspection apparatus further includes an impurity indicator configured to indicate the presence of an impurity in fluid flowing through the flow path.

19 Claims, 15 Drawing Sheets

(56) References Cited

U.S. PATENT DOCUMENTS

| | | | |
|---|---|---|---|
| 8,368,894 B2 | 2/2013 | Stevens | |
| 2004/0142384 A1 | 7/2004 | Cohen | |
| 2007/0090055 A1 * | 4/2007 | Newman | B03C 1/286 210/695 |
| 2011/0051140 A1 | 3/2011 | Stevens | |
| 2015/0369722 A1 | 12/2015 | Donner | |
| 2022/0226758 A1 * | 7/2022 | Bossini | B03C 1/286 |

FOREIGN PATENT DOCUMENTS

| | | | |
|---|---|---|---|
| GB | 2442093 | A | 3/2008 |
| GB | 2450501 | A | 12/2008 |
| GB | 2473122 | A | 3/2011 |
| KR | 20100092141 | A | 8/2010 |
| WO | 2010009590 | A1 | 1/2010 |

OTHER PUBLICATIONS

European Search Report cited in European patent application No. 24172778.3; Sep. 3, 2024; 7pp.

* cited by examiner

FLUID INSPECTION APPARATUS

RELATED APPLICATION DATA

This application claims the benefit of and priority to Great Britain Patent Application No. GB 2306236.7 filed Apr. 27, 2023 in the Intellectual Property Office of the United Kingdom. The entire contents of this prior filed application are hereby incorporated by reference herein.

TECHNICAL FIELD

The present disclosure relates to a fluid inspection apparatus.

In particular, the disclosure is concerned with a fluid inspection apparatus configured to define an inspection section of a fluid flow passage of a system.

BACKGROUND

Many systems incorporate a fluid as part of their operation. For example, water boiler heating circuits, air conditioning units and circuits, underfloor heating systems, hydraulic actuators, water pumps and liquid fuel systems. A common requirement is that the fluid remains free of impurities, for example debris which becomes part of the fluid flow because of corrosion or equipment in the flow shedding parts of the material they are made from.

A known way to inspect the fluid is to bleed off a portion of the fluid to visually inspect it. However, this may provide the user with personal safety and material disposal issues (for example if the fluid is hazardous). Filters may also be provided in flow systems, but these only indicate what material has been removed from the flow, not what may remain in it. Both of these methods rely on a relatively high concentration of debris to be present before the presence of the impurity is apparent from a visual inspection. These methods also require a level of technical expertise and confidence that a user may not have.

Hence an apparatus that enables a user to get an indication of the quality of the fluid over a range of impurity concentrations while remaining isolated from the fluid, is highly desirable.

SUMMARY

According to the present disclosure there is provided an apparatus and system as set forth in the appended claims. Other features of the invention will be apparent from the dependent claims, and the description which follows.

Accordingly, there may be provided a fluid inspection apparatus (100) configured to define an inspection section (102) of a fluid flow passage (12) of a system (10). The fluid inspection apparatus (100) may comprise a body element (110) having a wall (112) which defines the inspection section (102), a flow inlet (114) to the inspection section (102) and a flow outlet (116) from the inspection section (102). The inspection section (102) may define a flow path (120) between the flow inlet (114) and the flow outlet (116).

There may be provided a fluid inspection apparatus (100) configured to define an inspection section (102) of a fluid flow passage (12) of a system (10). The fluid inspection apparatus (100) may comprise a body element (110) having a wall (112) which defines the inspection section (102), a flow inlet (114) to the inspection section (102) and a flow outlet (116) from the inspection section (102); the inspection section (102) defining an unobstructed flow path (120) between the flow inlet (114) and the flow outlet (116).

The fluid inspection apparatus (100) may further comprise an impurity indicator (200) configured to indicate the presence of an impurity in fluid flowing through the flow path (120).

The inspection section (102) may define a central flow axis (122) which extends along the extent of the body element (110). The body element (110) may define a first end face (130) spaced apart from a second end face (132) along the extent of the body element (110).

The flow inlet (114) may be provided on the first end face (130). The flow outlet (116) may be provided on the second end face (132). The inspection section (102) may extend along the extent of the body element (110).

The body element (110) may further comprise a first side (134) and a second side (136), each of the first side (134) and the second side (136) extending from the first end face (130) to the second end face (132), the first side (134) being opposite the second side (136) across the central flow axis (122).

The body element (110) may comprise a third side (136). The first side (134) may be opposite the third side (148) across the flow path (120). The second side (136) may extend between the first side (134) and the third side (148).

The body element (110) may define a second cavity (1402) along its length L in the third side (148) which extends at least part of the distance between the flow inlet (114) and the flow outlet (116). The second cavity (1402) may be offset from and fluidly isolated from the flow path (120). A second impurity indicator (2002) may be located in the second cavity (1402) such that it is fluidly isolated from the flow path (120). The second impurity indicator (2002) may be provided as a magnet (202).

The impurity indicator (200) may be located in the first side (134).

The second side (136) may define a viewing region (138) to inspect a region of the first side (134) in the vicinity of the impurity indicator (200).

The second side (136) of the body element (110) may comprise a transparent portion (180). At least a part of the remainder of the body element (110) may be opaque or translucent.

The body element (110) may be transparent.

The first side (134) may define a first flat outer surface (144) and the second side (136) may define a second flat outer surface (146).

The body element (110) may be cuboid such that the first flat outer surface (144) is parallel to the second flat outer surface (146).

The body element (110) may be formed from a material chosen from a list comprising polyurethane resin, epoxy resin, plastic, polymer, graphene, glass, acrylic, amorphous thermoplastic polymer, polyphthalamide and silicone.

The body element (110) material may comprise a thermochromic pigment such that the body element (110) is operable to change colour in response to the temperature of the fluid in the inspection section (102) being above a predetermined value.

The body element (110) material may comprise a phosphorescent pigment such that the body element (110) is operable to emit light in response to absorbing light from a light source.

The body element (110) may further comprise a light source (300) mounted on and/or embedded in the body element (110), and the fluid inspection apparatus (100) further comprises a power source (400) to operate the light source (300).

The power source (400) may comprise a thermoelectric generator (402) operable to generate electricity using heat energy extracted from the fluid passing through the inspection section (102).

The impurity indicator (200) may be configured to indicate the presence of a dissolved mineral in the fluid.

The impurity indicator (200) may be configured to indicate the presence of particulates in the fluid.

The impurity indicator (200) may be a light source (300).

The impurity indicator (200) may be a magnet (202).

The magnet (202) may be a permanent magnet chosen from a list comprising a neodymium iron boron (NdFeB) magnet, a samarium cobalt (SmCo) magnet, an alnico magnet, a ceramic magnet and a ferrite magnet.

The magnet (202) may be an electromagnet.

The body element (110) may define a cavity (140) along its length L which extends at least part of the distance between the flow inlet (114) and the flow outlet (116), and the cavity (140) being offset from and fluidly isolated from the flow path (120), the impurity indicator (200) being located in the cavity (140) such that it is fluidly isolated from the flow path (120).

The cavity (140) may be provided as a recess (142) on the first flat outer surface (144).

The cavity (140) may be provided beneath and covered by material which defines the first flat outer surface (144).

The inspection section (102) may have a constant diameter D along its length between the flow inlet (114) and the flow outlet (116).

The inspection section (102) may comprise a transparent sheath (160) which extends along at least part of the length L of the inspection section (102), the sheath (160) defining the inspection section (102) flow path (120) and the sheath (160) being bounded by the body element (110), the sheath (160) comprising a different material to the body element (110).

The surface roughness of the material may define the flow path (120) of the inspection section (102) has a Ra value of no more than 0.4 micrometres.

The flow inlet (114) and/or the flow outlet (116) may comprise a fluid coupling element (170) for fluidly coupling the body element (110) to the fluid flow passage (12) of the system (10).

The inspection section (102) may define an unobstructed flow path (120) between the flow inlet (114) and the flow outlet (116).

A magnetic mesh element (500) may be provided in the inspection section (102), extending at least part of the distance between the flow inlet (114) and the flow outlet (116).

The fluid inspection apparatus (100) may further comprise a flow diagnostic apparatus (600) operable to capture and record fluid observation data comprising an image of the fluid in the inspection section (102) and/or sound of the fluid in inspection section (102).

The flow diagnostic apparatus (600) may be operable to determine a fluid quality indicator of the fluid in the inspection section (102) in dependence of the fluid observation data.

The flow diagnostic apparatus (600) may be operable to generate an output comprising the fluid quality indicator.

There may also be provided a system (10) comprising the fluid flow passage (12) which is, at least in part, defined by the fluid inspection apparatus (100) according to the present disclosure.

The second side (136) of the body element (110) may be positioned between a user viewing position A and the first side (134) of the body element (110).

There may be provided a system (10) comprising the fluid flow passage (12) which is, at least in part, defined by the fluid inspection apparatus (100) according to the present disclosure wherein the second side (136) of the body element (110) is positioned between a viewing position A and the inspection section (102).

The system (10) may form at least part of: a boiler heating circuit, a heat pump flow and return circuit, an electric boiler heating circuit, a cold water mains supply, a hot water outlet, an air conditioning unit, an air conditioning circuit, an underfloor heating system, an oil filter, a water pump circuit, and/or a fuel system.

Hence there is provided an apparatus that enables a user to get an indication of the quality of a fluid in a system over a range of impurity concentrations while remaining isolated from the fluid.

BRIEF DESCRIPTION OF THE DRAWINGS

Examples of the present disclosure will now be described with reference to the accompanying drawings, in which.

DETAILED DESCRIPTION

The present disclosure relates to a fluid inspection apparatus configured to define an inspection section of a fluid flow passage. The present disclosure also relates to a system comprising a fluid flow passage which is, at least in part, defined by the fluid inspection apparatus of the present disclosure.

Figure 1:
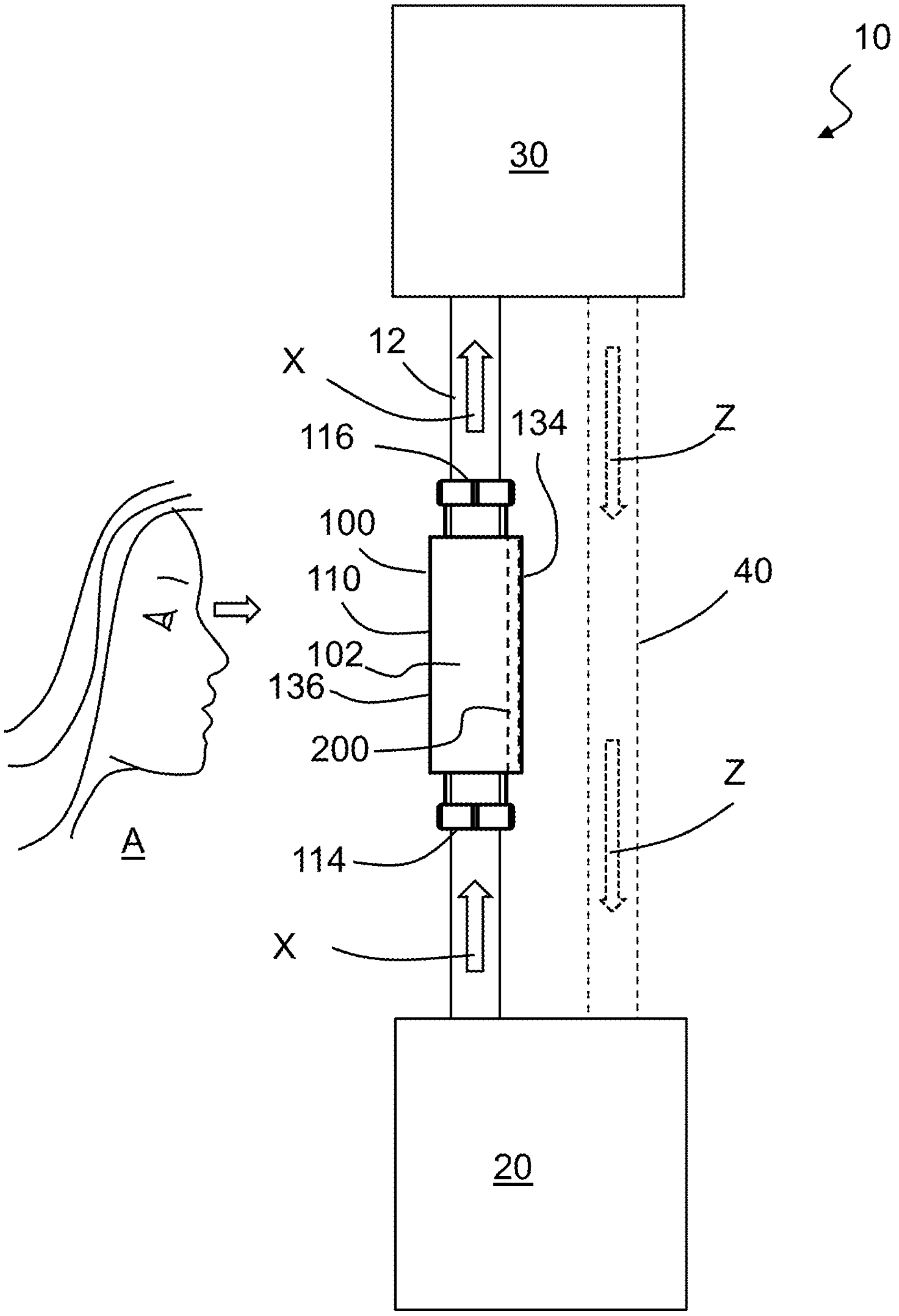
FIG. 1 shows an example system incorporating a fluid inspection apparatus according to the present disclosure.

By way of non-limiting example, shown in FIG. 1 is a diagrammatic representation of a system 10 according to the present disclosure. The system 10 comprises a fluid flow passage 12 configured for the flow of a fluid therethrough. As shown in FIG. 1, the system 10 may comprise a first fluid zone 20 and a second fluid zone 30, the first fluid zone 20 being in fluid communication with the second fluid zone 30 via the fluid flow passage 12, to allow fluid to flow therethrough as indicated by arrows X.

The system 10 may form at least part of: a boiler heating circuit, a heat pump flow and return circuit, an electric boiler heating circuit, a cold water mains supply, a hot water outlet, an air conditioning unit, an air conditioning system, and air conditioning circuit, an underfloor heating system, an oil filter for a land, sea or air vehicle, or a water pump circuit, a fuel system for a land, sea or air vehicle. The system 10 may form a part of any flow passage with a fluid passing therethrough.

By way of non-limiting example, the first fluid zone 20 may be a fluid reservoir and the second fluid zone 30 may be an apparatus which is fed fluid from the fluid reservoir. Alternatively, the first fluid zone 20 and the second fluid zone 30 may be different parts of the same apparatus, with the fluid flow passage 12 providing fluid communication therebetween.

In some examples, there may be provided a further flow passage 40 providing flow communication between the second fluid zone 30 and the first fluid zone 20 to allow fluid to flow therethrough as indicated by arrows Z.

As also shown in FIG. 1, there may be provided a fluid inspection apparatus 100 configured to define an inspection section 102 of the fluid flow passage 12 of the system 10. In a further example, not shown, there may be provided a fluid inspection apparatus 100 according to the present disclosure configured to define an inspection section 102 of the further flow passage 40 of the system 10. The fluid inspection apparatus 100 according to the present disclosure may be configured to operate with a fluid which is transparent or at least partially transparent.

Figure 22:
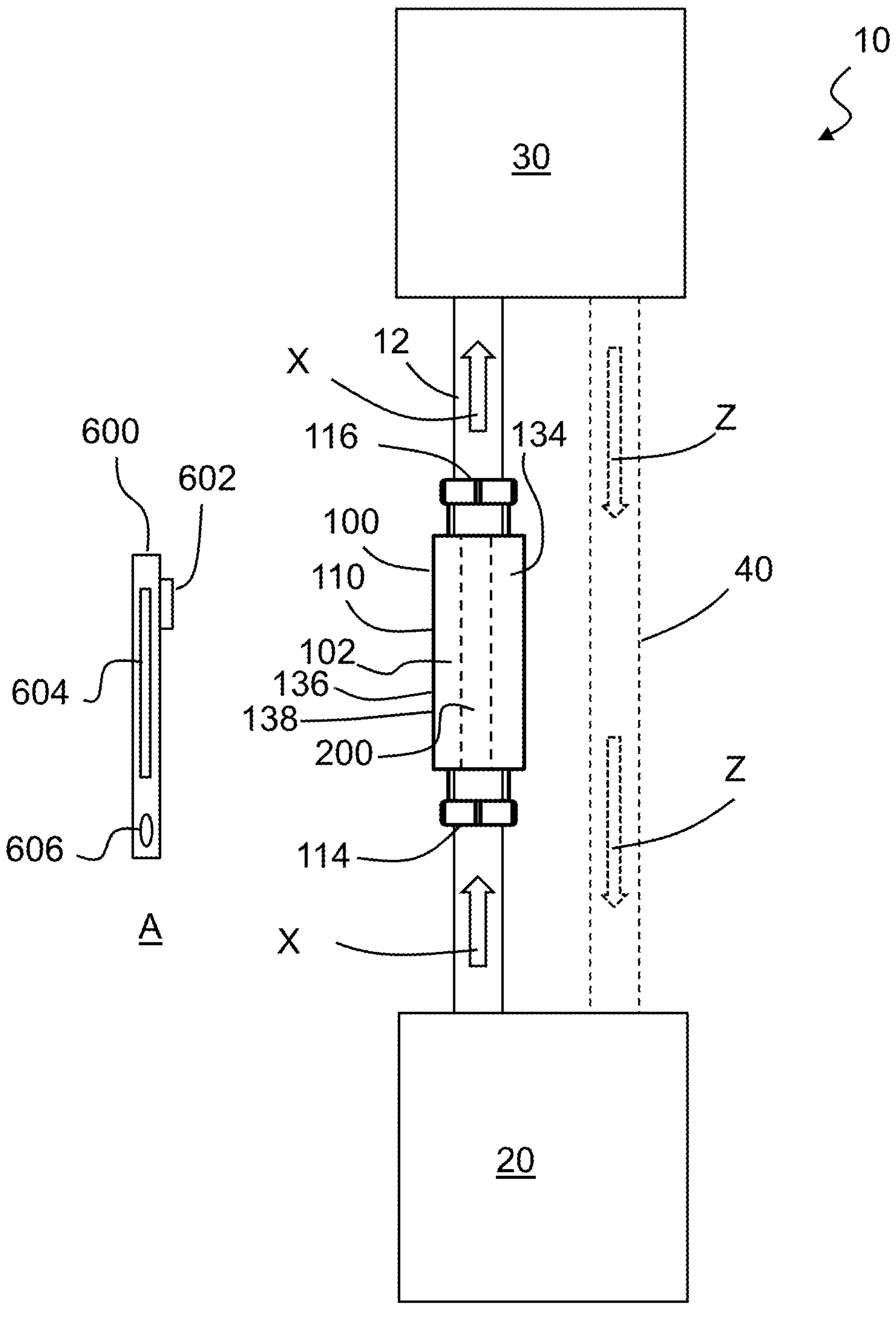
FIG. 22 shows an example system incorporating a fluid inspection apparatus and flow diagnostic apparatus according to the present disclosure.

In an example in which the system 10, as shown in FIGS. 1, 22, forms at least part of a boiler heating circuit comprising a boiler and heating units (for example radiators), the boiler may define the first fluid zone 20 and the heating units may define the second fluid zone 30. Hence in such a system there may be provided a fluid inspection apparatus 100 in the flow path from the boiler to the heating units. Alternatively, or additionally there may be provided a fluid inspection apparatus 100 in the return path from the boiler to the heating units.

As shown in FIGS. 2 to 11, the fluid inspection apparatus 100 may comprise a body element 110 having a wall 112 which defines the inspection section 102. The wall 112 may also define a flow inlet 114 to the inspection section 102 and a flow outlet 116 from the inspection section 102. That is to say, the inspection section 102 is a flow passage or flow duct. The inspection section 102 may define an unobstructed flow path 120 between the flow inlet 114 and the flow outlet 116. That is to say, there is nothing provided in the flow path 120 between the flow inlet 114 and the flow outlet 116.

In other examples, for example as shown in FIGS. 18 to 21, a magnetic mesh element 500 may be provided in the inspection section 102. The magnetic mesh element 500 may extend at least part of the distance between the flow inlet 114 and the flow outlet 116.

The magnetic mesh element 500 may be formed from a single wire element which extends in coils (e.g. the wire element is wound such that it is formed from a joined sequence of rings) at least part of the distance between the flow inlet 114 and the flow outlet 116. The mesh may be formed from a single wire element which is bent (e.g. curved) within the inspection section 102 such that a relatively large surface area of the mesh element is exposed to fluid in the inspection section 102 to thereby slow flow of fluid in the inspection section 102 and attract particles to the surface of the mesh element 500.

As illustrated in the figures, the mesh element 500 may comprise a coiled section, the coil extending at least part of the distance between the flow inlet 114 and the flow outlet 116 such that a flow path is defined around the sides of, the coil, through the centre of the coil and/or between adjacent sections (e.g. rings) of the coil.

Figure 2:
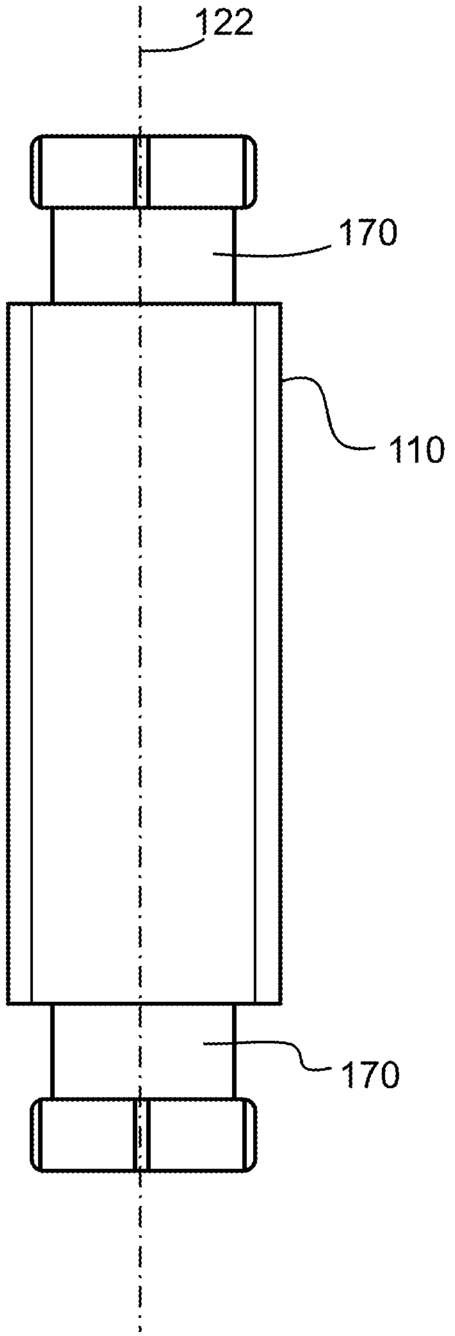
FIG. 2 shows a side view of a fluid inspection apparatus according to the present disclosure.
Figure 3:
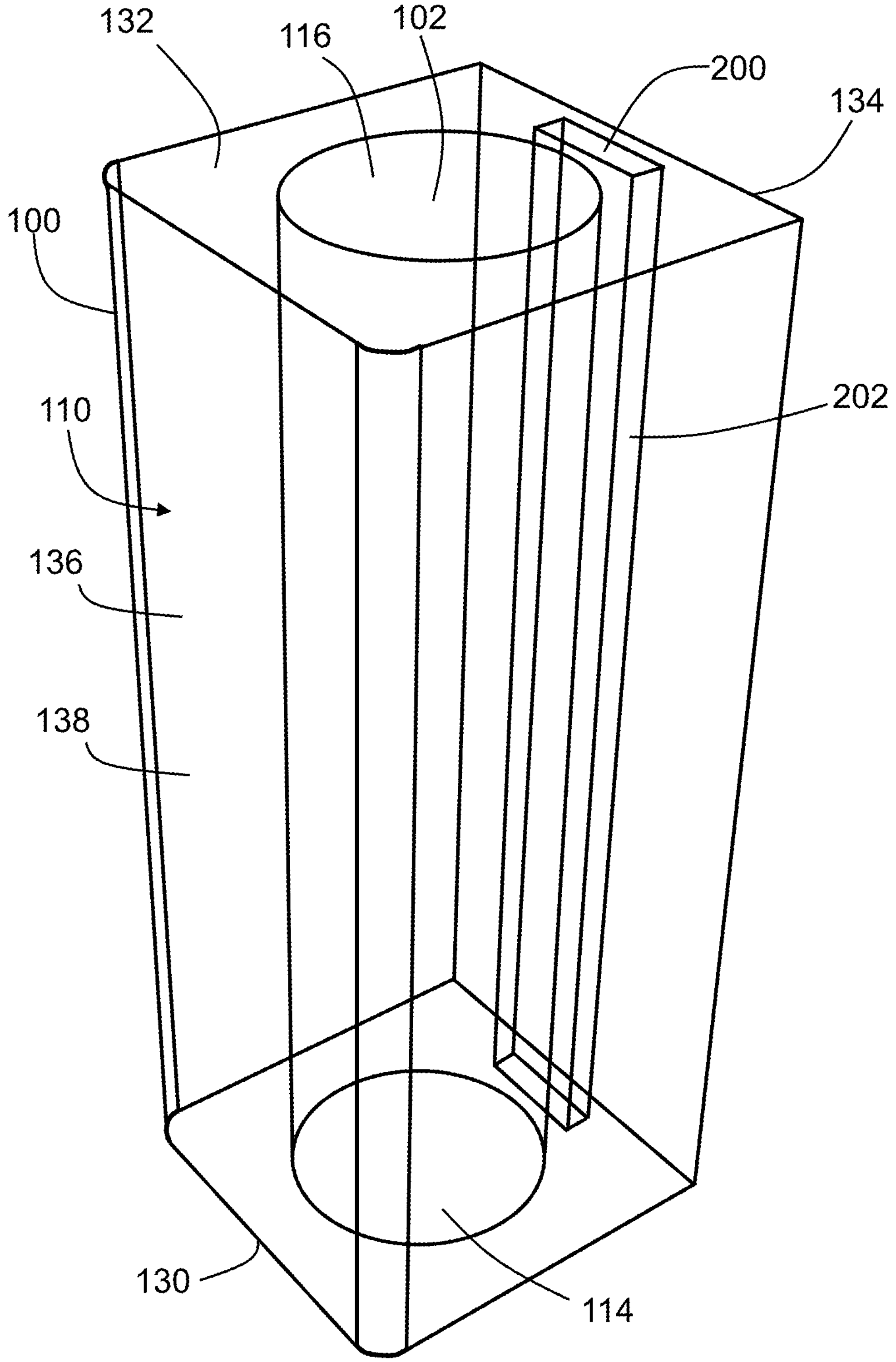
FIG. 3 shows a perspective view of an example of the fluid inspection according to the present disclosure.
Figure 18:
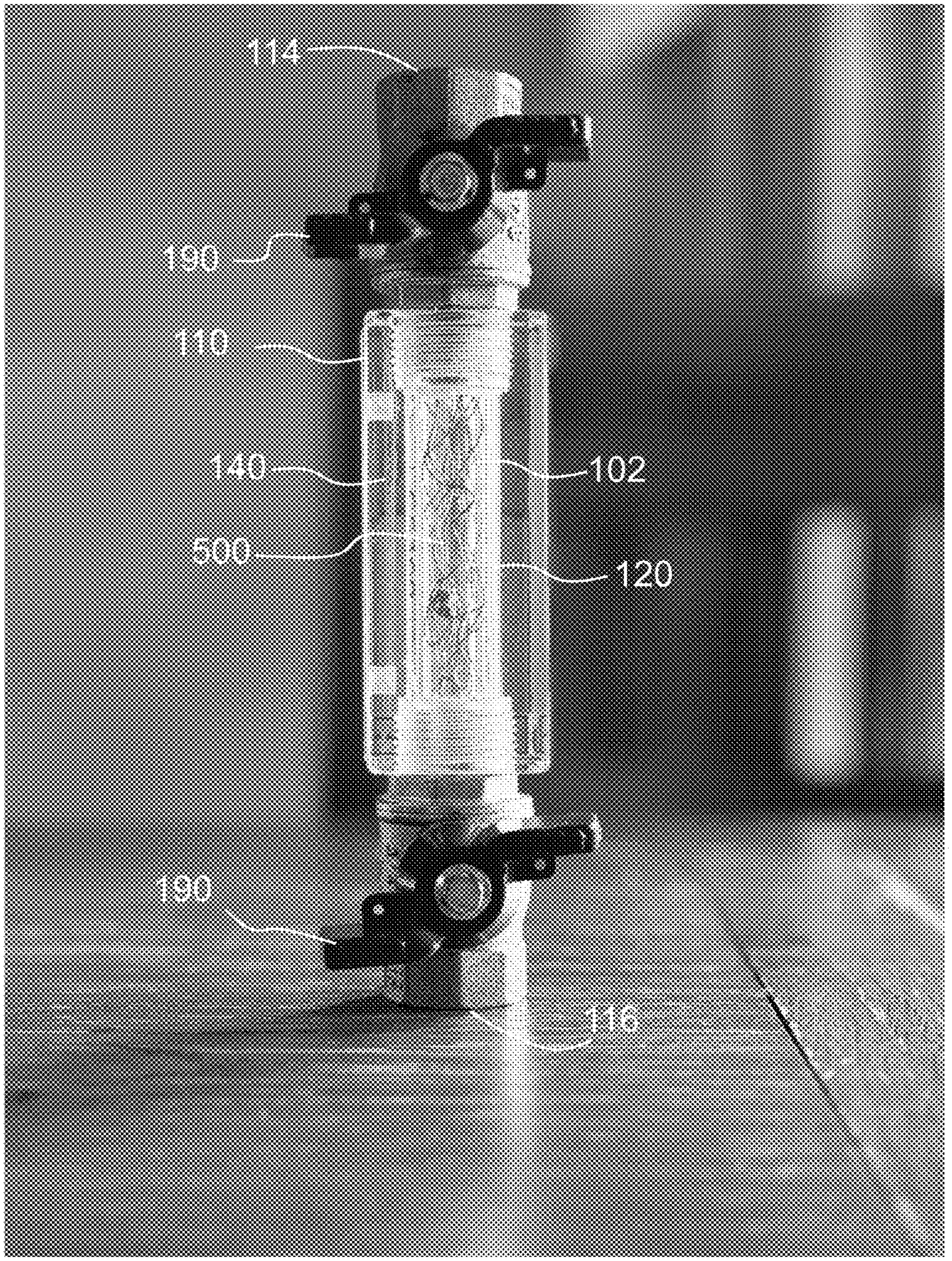
FIG. 18 shows a side view of a fluid inspection apparatus according to the present disclosure.
Figure 19:
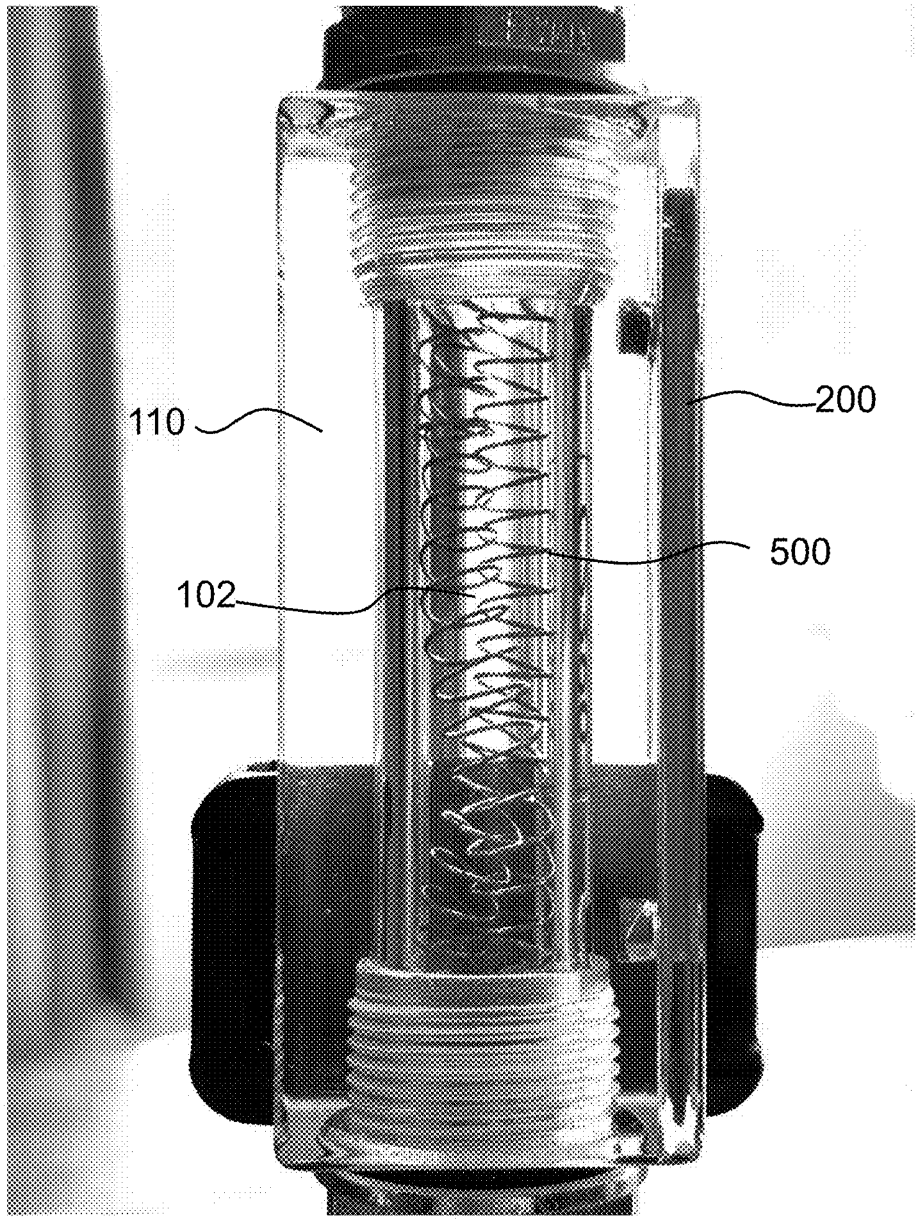
FIG. 19 shows an enlarged section of the view shown in FIG. 18.
Figure 20:
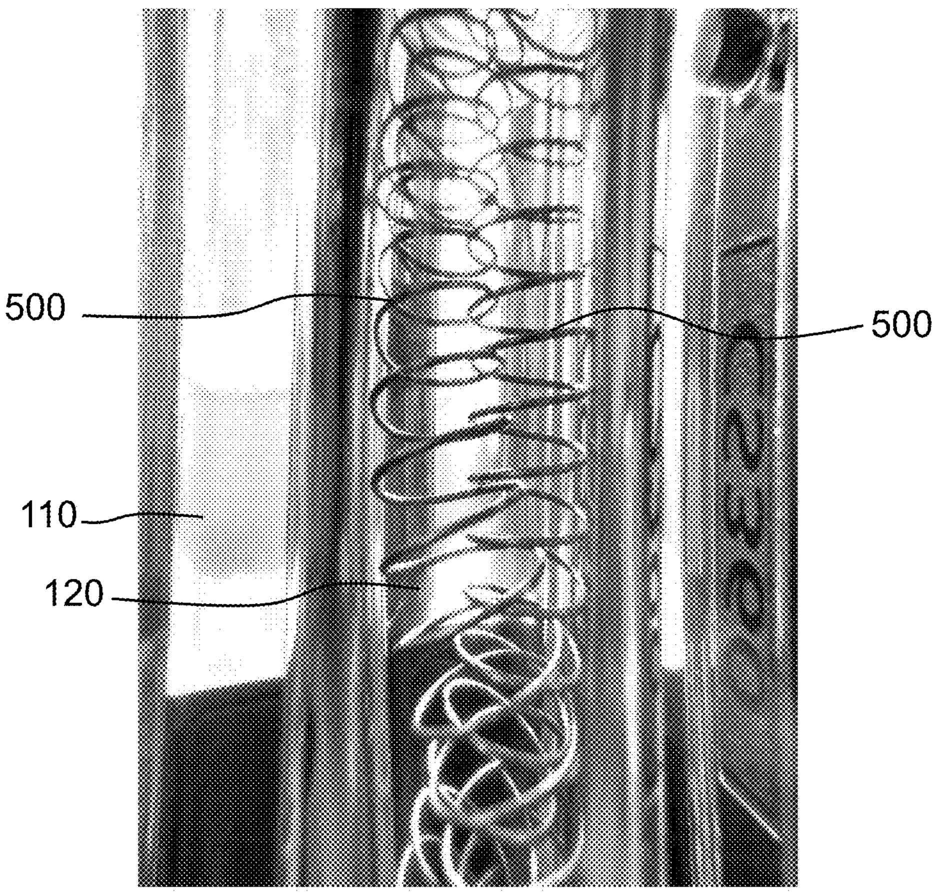
FIG. 20 shows a further enlarged section of the view shown in FIGS. 18, 19.
Figure 21:
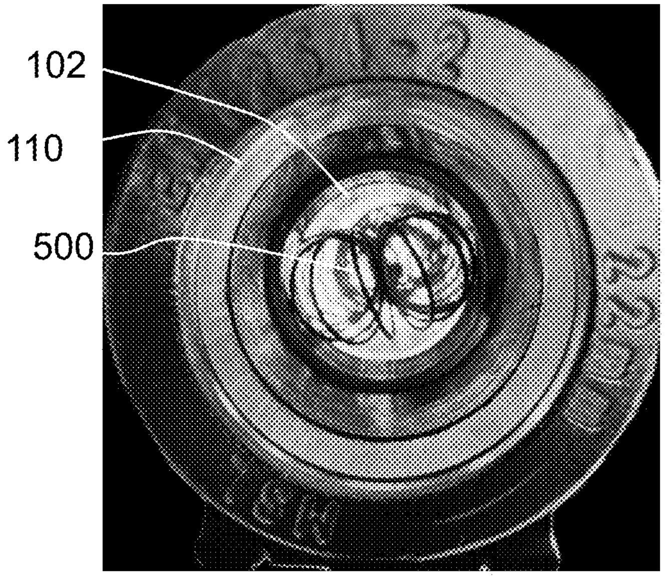
FIG. 21 shows an end on view of an inspection section of the fluid inspection apparatus shown in FIGS. 18 to 20.

As illustrated in FIGS. 1, 2, the flow inlet 114 and/or the flow outlet 116 may comprise a fluid coupling element 170 for fluidly coupling the body element 110 to the fluid flow passage 12 of the system 10. That is to say, a fluid coupling element 170 for fluidly coupling the body element 110 to the fluid flow passage 12 of the system 10 may extend from each of the flow inlet 114 and/or the flow outlet 116. As illustrated in FIG. 18, at least one of the fluid coupling elements 170 may comprise a flow valve 190.

The fluid inspection apparatus 100 may further comprise an impurity indicator 200.

The impurity indicator 200 is configured to indicate the presence of an impurity in fluid flowing through the flow path 120. The impurity indicator 200 may be configured to indicate the presence of one or more impurities in fluid flowing through the flow path 120.

In the present disclosure the term "impurity" is intended to mean a material which is not part of the desired or required composition of the fluid and that may impair the performance of the system 10 which it flows through.

The impurity detector 200 may be a passive device. That is to say, the impurity detector may have no moving parts. The impurity detector 200 may be chemically inert. The impurity detector 200 may be a solid state device.

In one example, the impurity indicator 200 is configured to indicate the presence of a dissolved mineral in the fluid. For example, in a system in which the fluid is water, the impurity indicator 200 may be configured to indicate the presence of a calcium carbonate dissolved in the water.

In another example the impurity indicator 200 is configured to indicate the presence of particulates in the fluid. For example, the impurity indicator 200 may be configured to indicate the presence of metal particles in the water. The impurity indicator 200 may be configured to indicate the presence of magnetic particles in the water.

The impurity indicator 200 may be provided as a magnet 202, which is effective for the attraction of dissolved calcium carbonate and magnetic particles/debris. In a further example (and as described below) the impurity indicator 200 may be provided as a light source 300.

In examples in which the impurity indicator 200 is provided as a magnet 202, the magnet 202 may be a permanent magnet 202 chosen from a list comprising a neodymium iron boron (NdFeB) magnet 202, a samarium cobalt (SmCo) magnet 202, an alnico magnet 202, a ceramic magnet 202 and a ferrite magnet 202.

The magnet 202 may be an electromagnet.

In an example of the present disclosure, as shown in FIGS. 3 to 9, the body element 110 defines a cavity 140 (for example an elongate cavity 140) along a length L of the body element 110, wherein the cavity 140 extends at least part of the distance between the flow inlet 114 and the flow outlet 116. The cavity 140 may extend along the full length L of the body element 110 between the flow inlet 114 and the flow outlet 116.

The inspection section 102 (i.e., the flow path 120) may have a constant diameter D along its length between the flow inlet 114 and the flow outlet 116.

The cavity 140 is offset from, and fluidly isolated from, the flow path 120. Hence, in use, the cavity 140 is fluidly isolated from fluid passing through the flow path 120. The impurity detector 200 may be configured to fit snugly within the cavity 140. Hence the impurity detector 200 may be provided as a flat elongate cuboid to match the dimensions of the cavity 140.

The impurity detector 200 (e.g., magnet 202), when located in the cavity 140, is fluidly isolated from the flow path 120 (and hence, in use, is fluidly isolated from fluid passing through the flow path 120). The impurity detector 200 (e.g., magnet 202) may extend part of the distance along the cavity 140. The impurity detector 200 (e.g., magnet 202) may extend along the full length L of the body element 110 between the flow inlet 114 and the flow outlet 116.

As illustrated in FIGS. 2, 4, 5, 10, 11, the inspection section 102 may define a central flow axis 122 which extends along the extent of the body element 110. Hence the flow path 120 may be centred on, or at least encompass, the central flow axis 122.

The body element 110 may define a first end face 130 spaced apart from a second end face 132 along the extent of the body element 110. The flow inlet 114 may be provided on the first end face 130 and the flow outlet 116 may be provided on the second end face 132 such that the inspection section 102 extends along the extent of the body element 110.

The body element 110 may further comprise a first side 134 and a second side 136, each of the first side 134 and the second side 136 extending from the first end face 130 to the second end face 132, the first side 134 being opposite the second side 136 across the central flow axis 122. The first side 134 may be parallel to the second side 136.

The impurity indicator 200 may be located in the first side 134. Such an example is illustrated in FIGS. 1, 7 to 9. The impurity detector 200 may be flush with the material of the first side 134 when located within the cavity 140.

The second side 136 may define a viewing region 138 to inspect a region of the first side 134 in the vicinity of the impurity indicator 200.

In alternative examples, as shown in FIGS. 14 to 17, the body element 110 may comprise a first side 134, a second side 136 and a third side 148. The first side 134 may be opposite the third side 148 across the flow path 120. The second side 136 may extend between the first side 134 and the third side 148. Each of the first side 134, second side 136 and third side 148 may extend from the first end face 130 to the second end face 132. The first side 134 may be parallel to the third side 148. The second side 136 may be orthogonal to (e.g. perpendicular to) the first side 134 and the third side 148.

Figure 14:
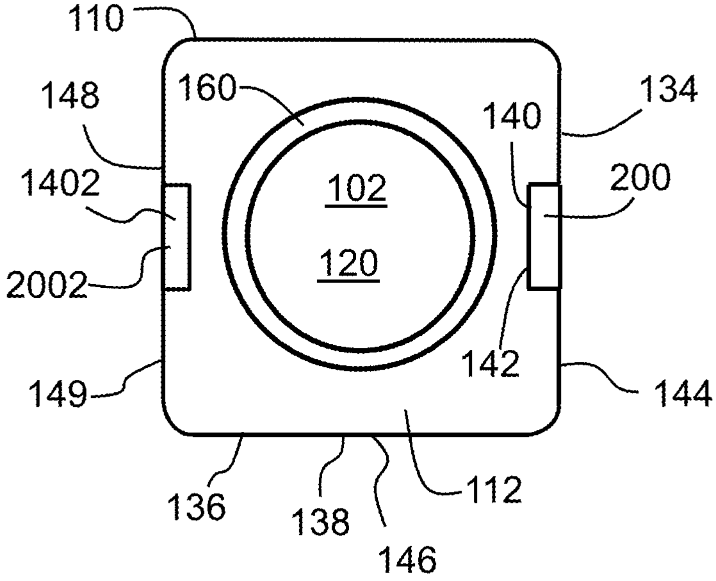
FIG. 14 shows a plan view of a further example of the fluid inspection apparatus according to the present disclosure.
Figure 15:
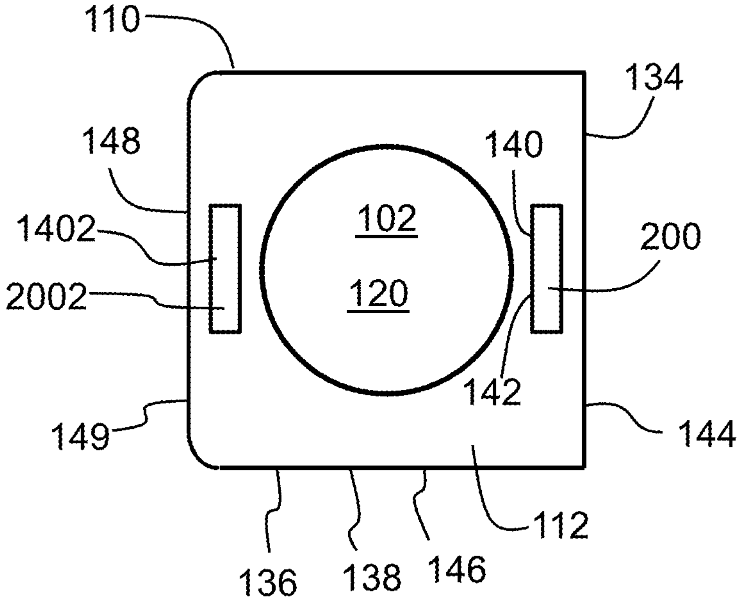
FIG. 15 shows a plan view of an additional example of the fluid inspection apparatus according to the present disclosure.

In the examples shown in FIGS. 14, 15, the body element 110 defines a second cavity 1402 (for example an elongate cavity 1402) along its length L in the third side 148. The second cavity 1402 may extend at least part of the distance between the flow inlet 114 and the flow outlet 116. The second cavity 1402 may extend along the full length L of the body element 110 between the flow inlet 114 and the flow outlet 116. The second cavity 1402 may be offset from and fluidly isolated from the flow path 120. The second cavity 1402 is fluidly isolated from the cavity 140. A second impurity indicator 2002 may be located in the second cavity 1402 such that it is fluidly isolated from the flow path 120. The second impurity indicator 2002 may be magnet 202. The impurity indicator 200 and the second impurity indicator 2002 may be configured to be the same as one another (e.g. having the same properties and functionality).

Hence, an impurity indicator 200 may be located only in the first side 134 (for example as shown in the examples of FIGS. 1, 7 to 9, 16, 17). In other examples an impurity indicator 200 may be located in the first side 134 and a second impurity indicator 2002 may be located in the third side 148 (for example as illustrated in FIGS. 14, 15).

Figure 16:
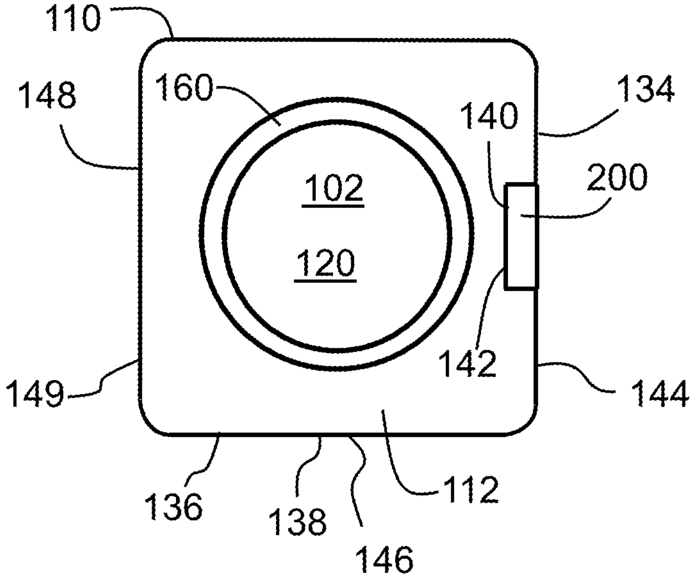
FIG. 16 shows a plan view of a further example of the fluid inspection apparatus according to the present disclosure.
Figure 17:
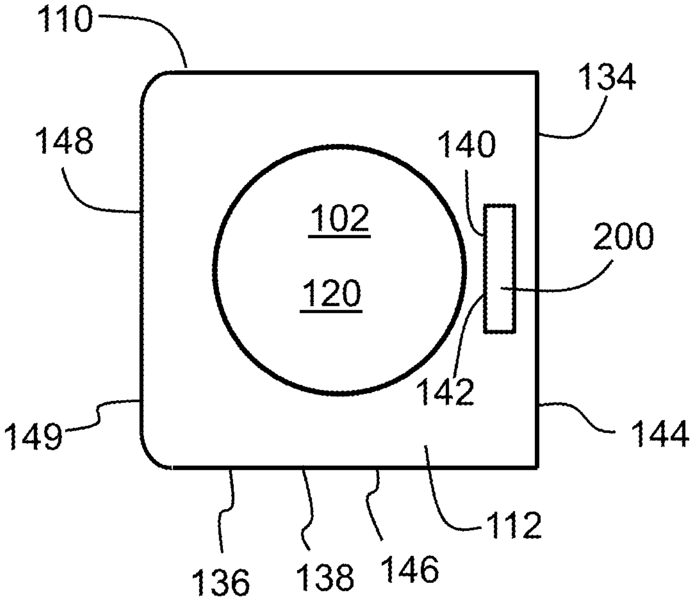
FIG. 17 shows a plan view of an additional example of the fluid inspection apparatus according to the present disclosure.

In some examples in which there are provided a first side 134, a second side 136 and a third side 148, the impurity indicator 200 may be located only in the first side 134. In such an example, the second side 136 may define the viewing region 138 to inspect a region of the first side 134 in the vicinity of the impurity indicator 200. In such an example, the first side 134 may be parallel to the third side 148. In such an example the second side 136 may be orthogonal to (e.g. perpendicular to) the first side 134 and the third side 148. Examples of this arrangement are shown in FIGS. 16, 17.

The magnetic mesh element 500 may be provided in the inspection section 102 in an example in which an impurity indicator 200 is located only in the first side 134. In examples in which the impurity detector 200 is a magnet 202, the mesh element 500 may be magnetised by the magnet 202.

The magnetic mesh element 500 may be provided in the inspection section 102 in an example in which an impurity indicator 200 may be located in the first side 134 and a second impurity indicator 2002 may be located in the third side 148 (for example as illustrated in FIGS. 14, 15). In an example in which the impurity detectors 200, 2002 are magnets 202, the mesh element 500 may be magnetised by the magnets 202.

Figure 8:
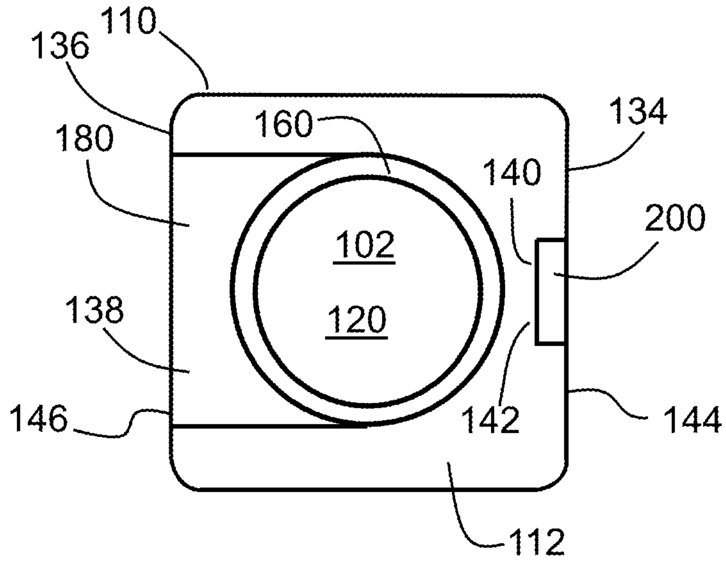
FIG. 8 shows a plan view of an additional example of the fluid inspection apparatus according to the present disclosure.

In one example, as shown in FIG. 8, the second side 136 of the body element 110 comprises a transparent portion 180 and at least a part of the remainder of the body element 110 is opaque. That is to say, the body element 110 may be opaque except for the transparent portion 180.

In another example, not shown, the second side 136 of the body element 110 comprises a transparent portion 180 and at least a part of the remainder of the body element 110 is translucent. That is to say, the body element 110 may be translucent except for the transparent portion 180.

In both examples the transparent portion 180 may extend from an outer surface of the body element 110 (e.g., the second side 136) to the inner surface of the flow path 120. That is to say, the transparent portion 180 may define a window through which a user can see the region of the flow path 120 on the other side of the body element 110 which is adjacent to the impurity indicator 200.

In another example (as illustrated in the figures) the body element 110 may be transparent. That is to say, the body element 110 may be made of a clear or substantially clear material through which a user can see the region of the flow path 120 adjacent to the impurity indicator 200.

Figure 7:
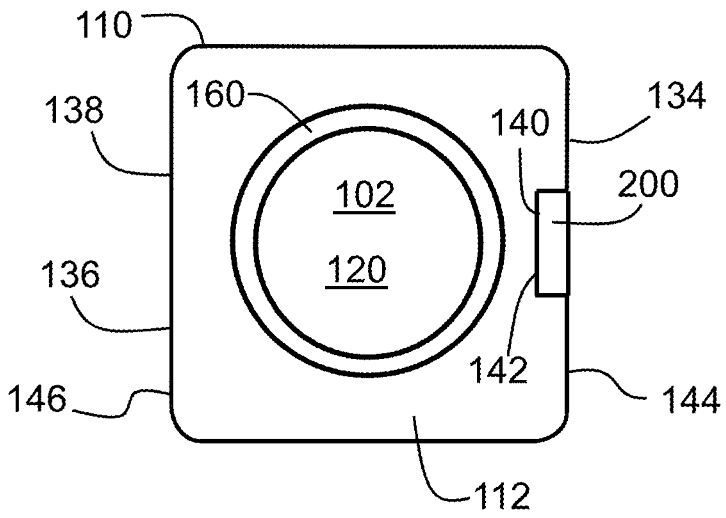
FIG. 7 shows a plan view of the further example of the fluid inspection apparatus according to the present disclosure, as shown in FIGS. 4, 5, 6.

As illustrated in FIGS. 7, 8 the inspection section 102 may comprise a transparent sheath 160 which extends along at least part of the length L of the inspection section 102. That is, the sheath 160 defines the inspection section 102 of the flow path 120 and the sheath 160 is bounded by the body element 110. The sheath 160 may be provided as a tube section. The sheath 160 may be provided with a constant outer diameter and/or a constant inner diameter along its length.

The sheath 160 may comprise a different material to the body element 110. By way of non-limiting example, the sheath 160 may be made of acrylic.

The sheath 160 may have a greater thermal tolerance than the material of the body element 110 material. The sheath 160 may be configured to thermally insulate the material of the body element 110 from the fluid flowing through the flow path 120.

The surface finish of the material which defines the flow path 120 of the inspection section 102 may be machined and/or polished to be smooth. The finish is configured such that debris and/or pollutants do not adhere to the surface of the flow path 120. For example, the surface roughness of the material which defines the flow path 120 of the inspection section 102 may have an Ra value of no more than 0.4 micrometres.

In all examples, and as shown in FIGS. 1, 22, when the fluid inspection apparatus 100 is fitted to the system 10, the second side 136 of the body element 110 may be positioned between a viewing position A and the inspection section 102.

In some examples, and as shown in FIG. 1, when the fluid inspection apparatus 100 is fitted to the system 10, the second side 136 of the body element 110 may be positioned between a user viewing position A and the first side 134 of the body element 110.

In some examples, and as shown in FIG. 22, when the fluid inspection apparatus 100 is fitted to the system 10 (wherein the system 10 is described above with reference to FIG. 1), the second side 136 of the body element 110 (i.e. the viewing region 138) may be positioned between a user viewing position A and the inspection section 102, with the first side 134 of the body element 110 extending orthogonally to the second side 136. In the example of FIG. 22, the impurity indicator 200 may be provided in the first side 134. Additionally, or alternatively, the second impurity indicator 2002 may be provided in the third side 148, where the third side 148 extends orthogonally to the second side 136 and the third side 148 is opposite the first side 134 across the flow path 120. Although a flow diagnostic apparatus 600 is shown in FIG. 22, it will be appreciated a user could be located at the user viewing position A shown in FIG. 22.

Hence the system is configured so a user may look through the viewing region 138 (e.g., the second side 136) to inspect a region of the first side 134 in the vicinity of the impurity indicator 200. As illustrated in the examples of FIGS. 14, 15, the system may be configured so a user may look through the viewing region 138 (e.g., the second side 136) to inspect a region of the first side 134 in the vicinity of the impurity indicator 200 and/or to inspect a region of the third side 148 in the vicinity of the second impurity indicator 2002. The fluid for inspection with the inspection apparatus 100 according to the present disclosure, when pure/clean should be transparent or at least partially transparent so that a viewer can see through the fluid across the flow path 120.

The first side 134 may define a first flat outer surface 144 and the second side 136 may define a second flat outer surface 146. The first flat outer surface 144 and/or the second flat outer surface 146 may be machined and/or polished. That is to say, the first flat outer surface 144 and/or the second flat outer surface 146 may be clear of surface irregularities such that they are optically clear.

The third side 148 may define a third flat outer surface 149. The third flat outer surface 144 may be machined and/or polished. That is to say, the third flat outer surface 149 may be clear of surface irregularities such that it is optically clear.

The body element 110 may have any suitable shape provided a user can see through from one side to another side to see a region of the first side 134 in the vicinity of the impurity indicator 200.

The body element 110 may have any suitable shape provided a user can see through from one side to another side to see a region of the first side 134 in the vicinity of the impurity indicator 200 and/or to see a region of the third side 148 in the vicinity of the second impurity indicator 2002.

The body element 110 may be a polyhedron or substantially polyhedron, wherein the first flat outer surface 144 may be parallel to the second flat outer surface 146.

As illustrated in the figures the body element 110 may be cuboid or substantially cuboid. Hence the first flat outer surface 144 may be parallel to the second flat outer surface 146. The first flat outer surface 144 may extend perpendicular (i.e. at a right angle) to the second flat outer surface 146. The first flat outer surface 144 may be parallel to the third flat outer surface 149.

In other examples the body element 110 may be cylindrical.

Figure 4:
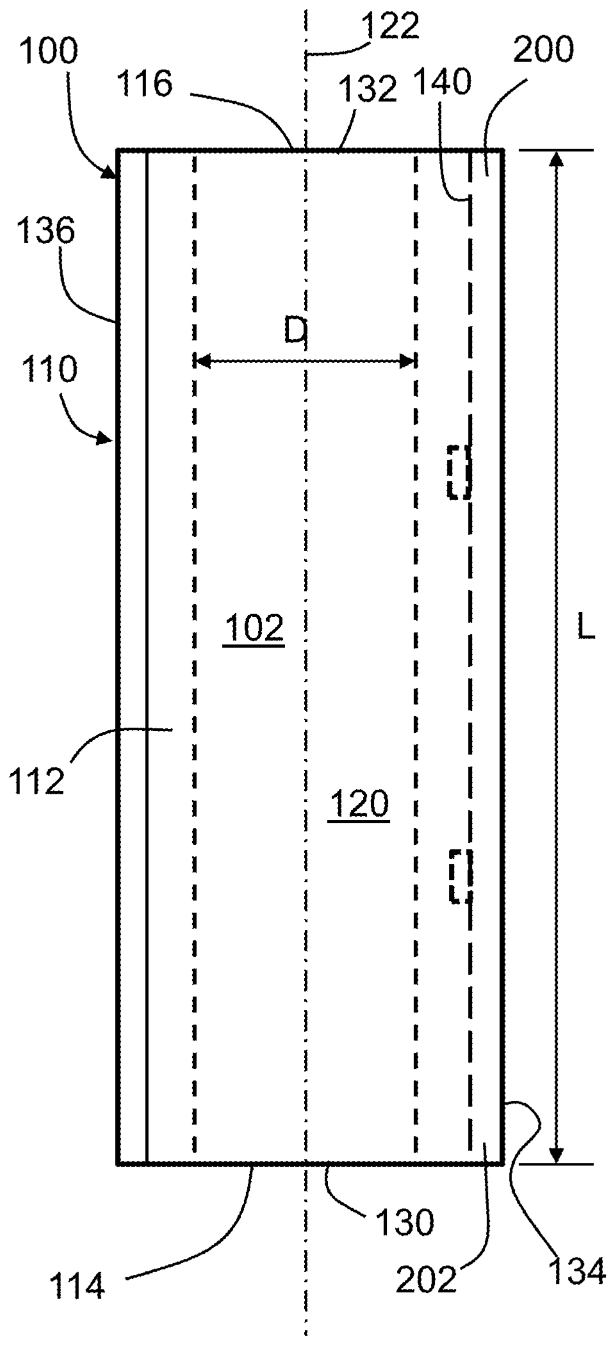
FIGS. 4, 5 show side views of a further example of the fluid inspection apparatus according to the present disclosure.
Figure 5:
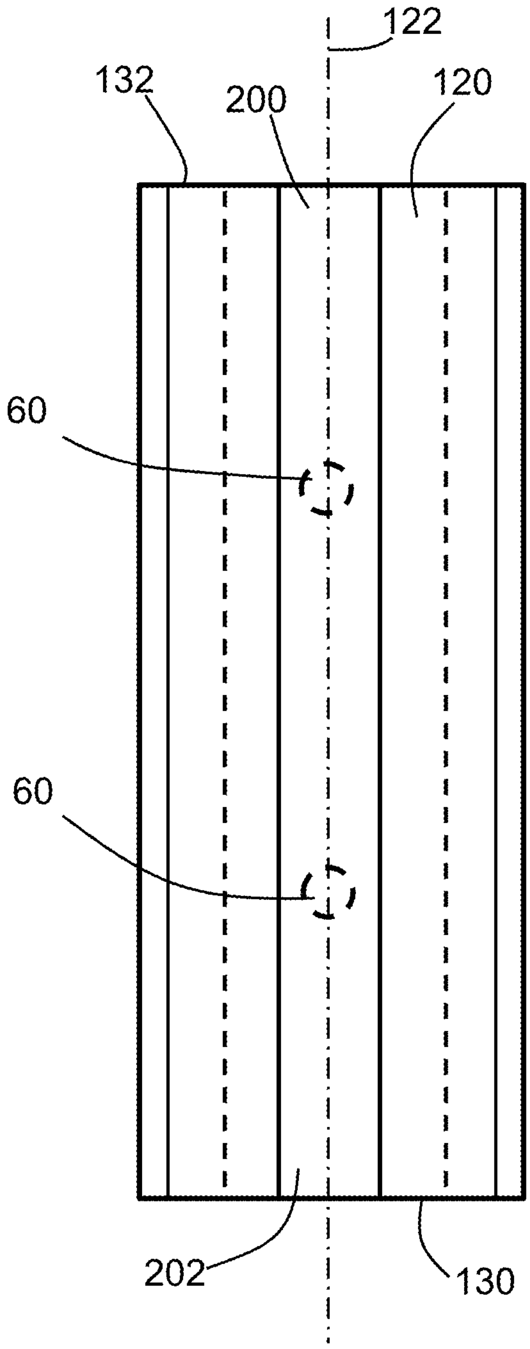

In the examples of FIGS. 4 to 8 the cavity 140 is provided as a recess 142 on the first flat outer surface 144. In such an example the impurity indicator 200 is fixed in place in the recess 142. The impurity indicator 200 may be fixed in place by any appropriate means. The impurity indicator 200 may be fixed in place with a fixing member (e.g. screw, bolt, clip). The impurity indicator 200 may be fixed in place with an adhesive. In the examples of FIGS. 4, 5 metal studs 60 are provided embedded in the material of the body element 110 to which the impurity indicator 200 is fixed/engaged. In examples in which the impurity indicator 200 is a magnet 202, the impurity indicator 200 is held in place by magnetic attraction between the metal studs 60 and the magnet 202.

Figure 9:
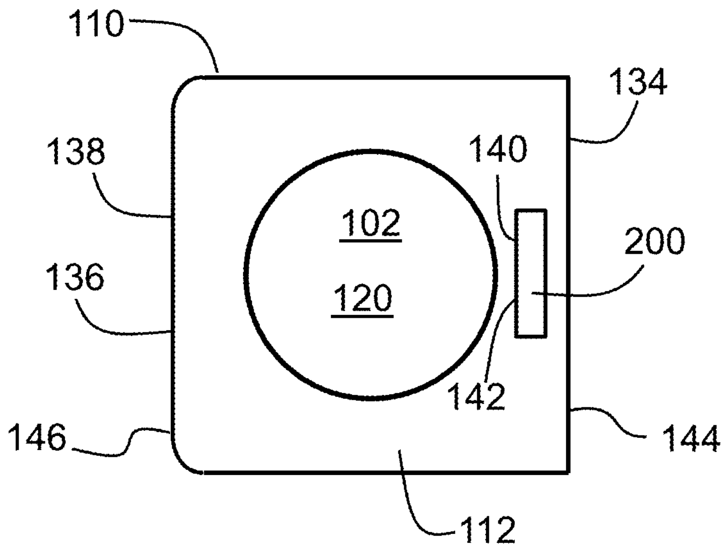
FIG. 9 shows a plan view of the example of the fluid inspection apparatus as shown in FIG. 3.

In the example of FIG. 9 the cavity 140 is provided beneath and covered by material which defines the first flat outer surface 144. Hence the impurity indicator 200 is located in the cavity 140, effectively embedded in the material of the body element 110.

The body element 110 may be formed from a material chosen from a list comprising polyurethane resin, epoxy resin, plastic, polymer, graphene, glass, acrylic, amorphous thermoplastic polymer, polyphthalamide and silicone. The material of the body element 110 may extend from the first end face 130 to the second end face 132.

The body element 110 material may comprise a thermochromic pigment such that the body element 110 is operable to change colour in response to the temperature of the fluid in the inspection section 102 being above a predetermined value.

The body element 110 material may comprise a phosphorescent pigment such that the body element 110 is operable to emit light (i.e., glow) in response to absorbing light from a light source.

Figure 6:
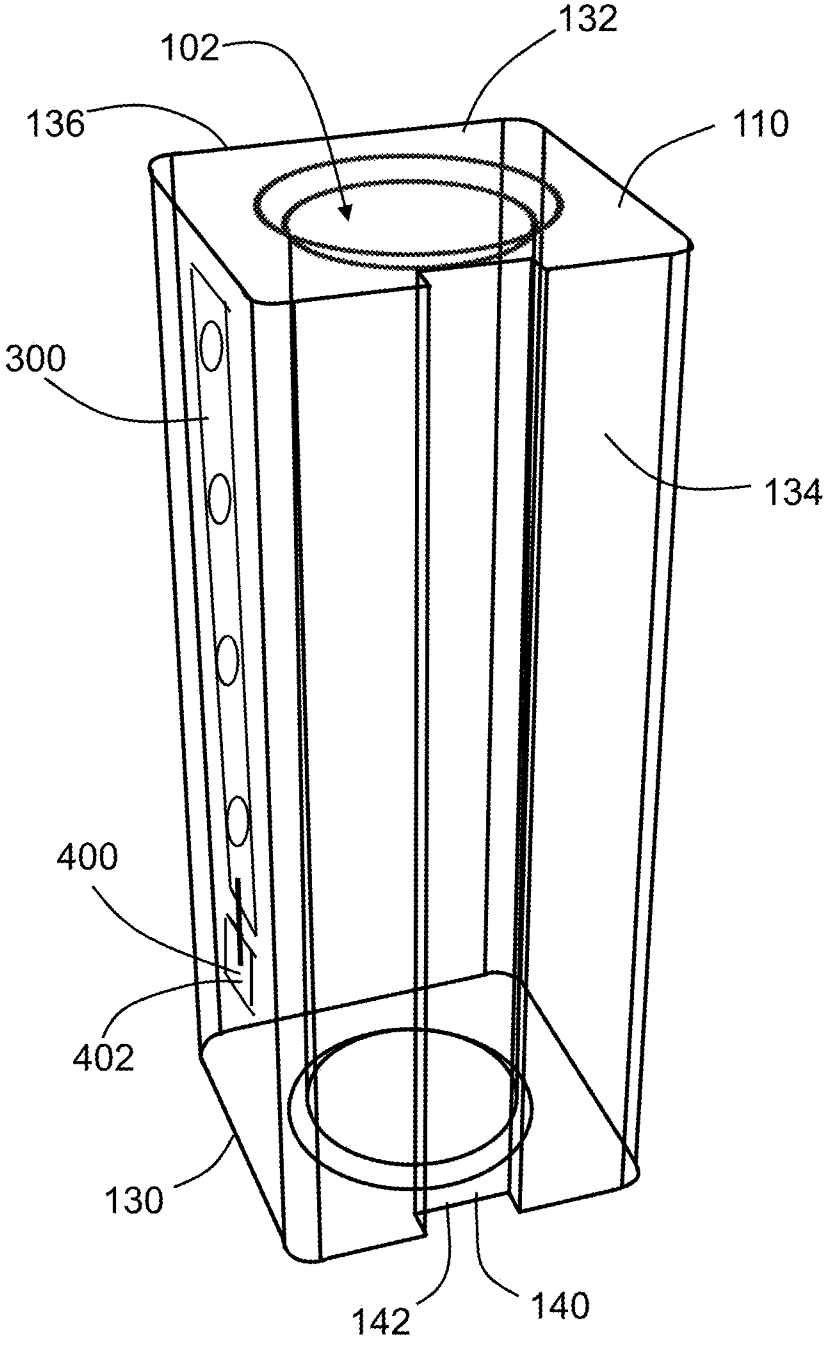
FIG. 6 shows a perspective view of the further example of the fluid inspection apparatus according to the present disclosure, as shown in FIGS. 4, 5.

In an example illustrated in FIG. 6, the body element 110 may further comprise a light source 300 mounted on and/or embedded in the body element 110. The body element 110 may further comprise a power source 400 to operate the light source 300. That is to say, the fluid inspection apparatus 100 may further comprise a light source 300 mounted on and/or embedded in the body element 110. The fluid inspection apparatus 100 may further comprise a power source 400 to operate the light source 300.

The light source 300 may be provided in/on the body element 110 in addition to a magnet 202 or other impurity indicator 200. That is to say the fluid inspection apparatus may comprise a magnet 202 and a light source 300.

Figure 12:
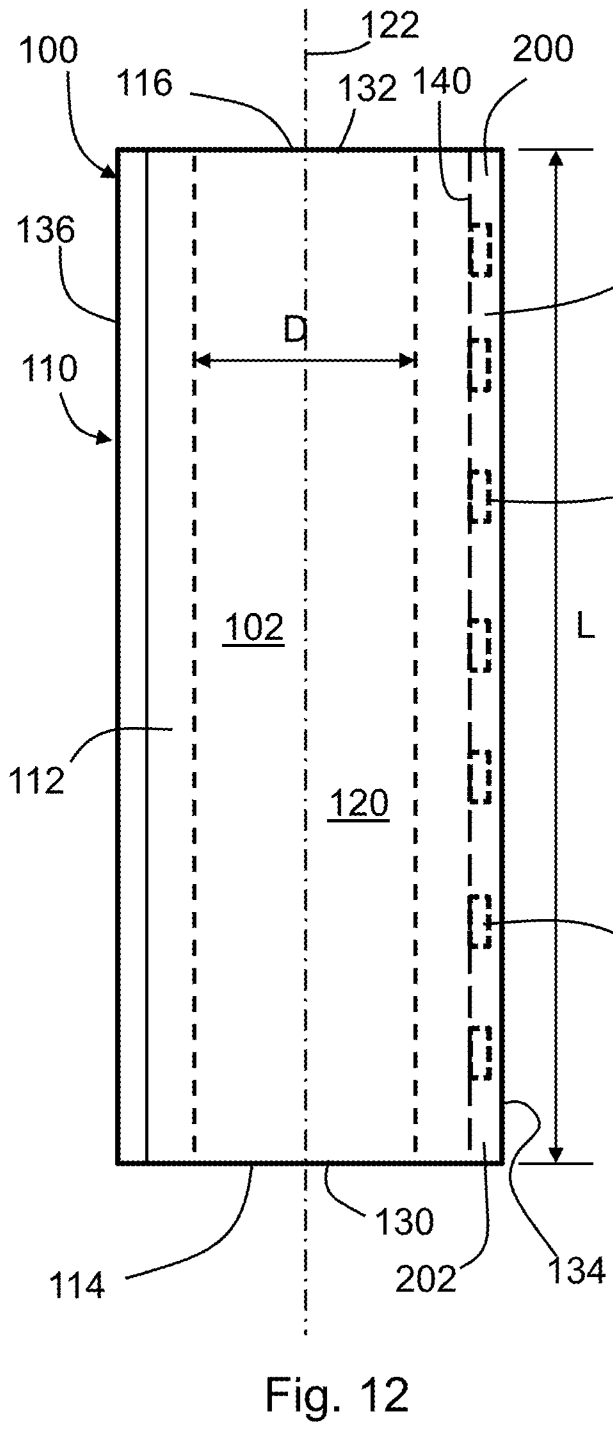
FIGS. 12, 13 illustrate different side views of another example of the fluid inspection apparatus of the present disclosure.
Figure 13:
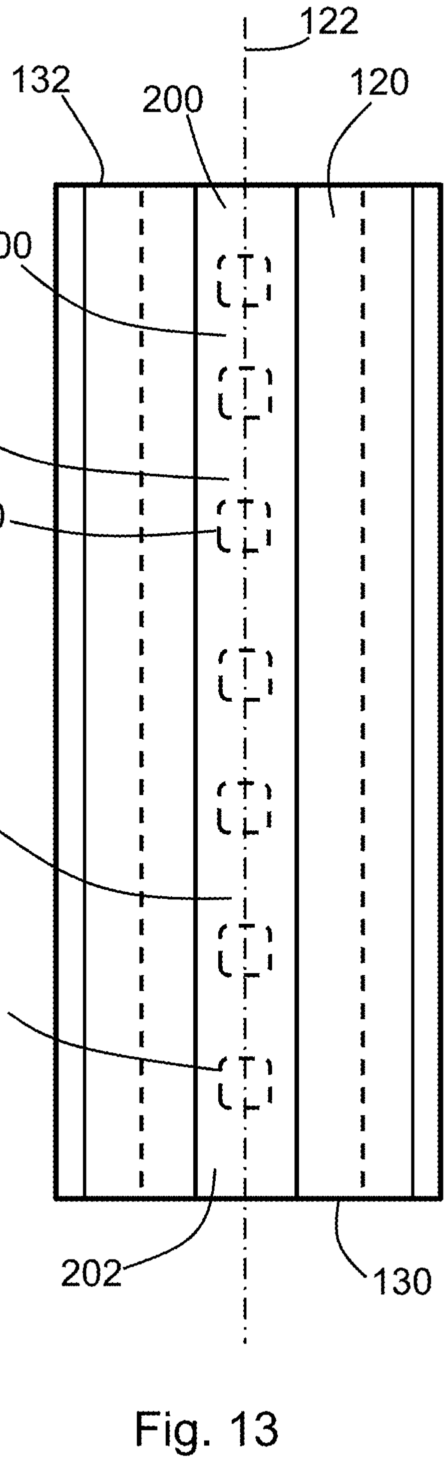

In a further example, as shown in FIGS. 12, 13, the impurity indicator 200 may be provided as a light source 300.

The light source 300 may be provided in the cavity 142, The light source may comprise a number of light emitting elements 310 (for example Light Emitting Diodes LEDs). The light source 300 may be configured to emit a specific wavelength (or range of wavelengths) of light which illuminate a target impurity. For example, the light source 300 may be configured to emit ultra-violet light to illuminate target impurities (for example particulates of a particular colour or composition, or chemicals) in the fluid.

The power source 400 may be mounted on and/or embedded in the body element 110.

In one example the power source 400 may be a battery.

In another example the power source 400 may comprise a thermoelectric generator 402 operable to generate electricity using heat energy. Depending on where the thermoelectric generator 402 is mounted, the heat energy may be extracted from fluid passing through the inspection section 102 and/or absorbed from the environment around the fluid inspection apparatus 100.

Figure 10:
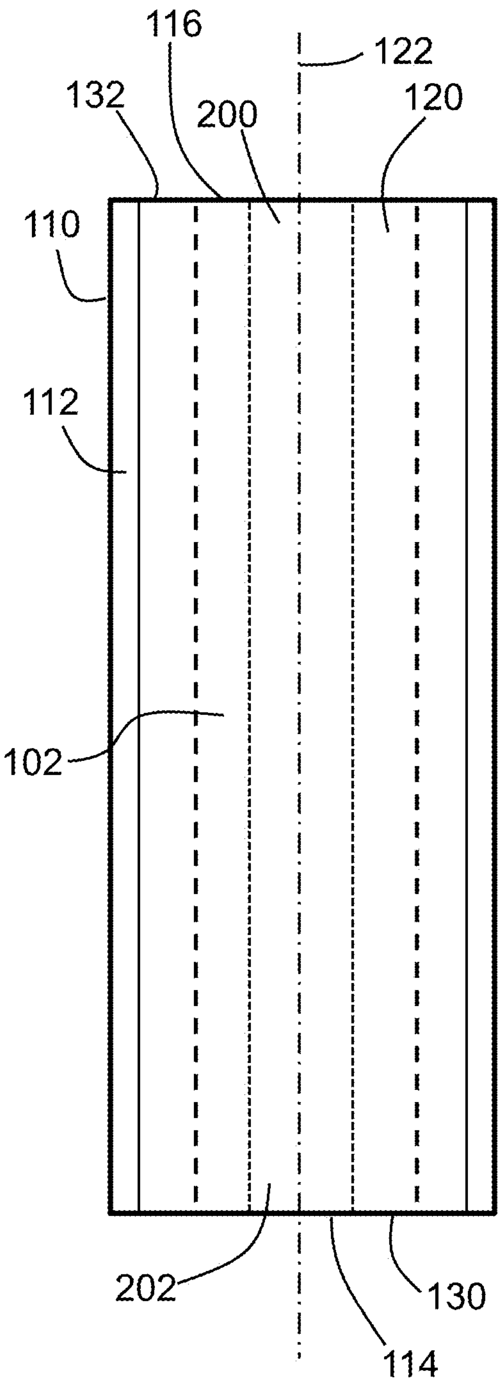
FIGS. 10, 11 illustrate the operation of an impurity indicator of the fluid inspection apparatus of the present disclosure.
Figure 11:
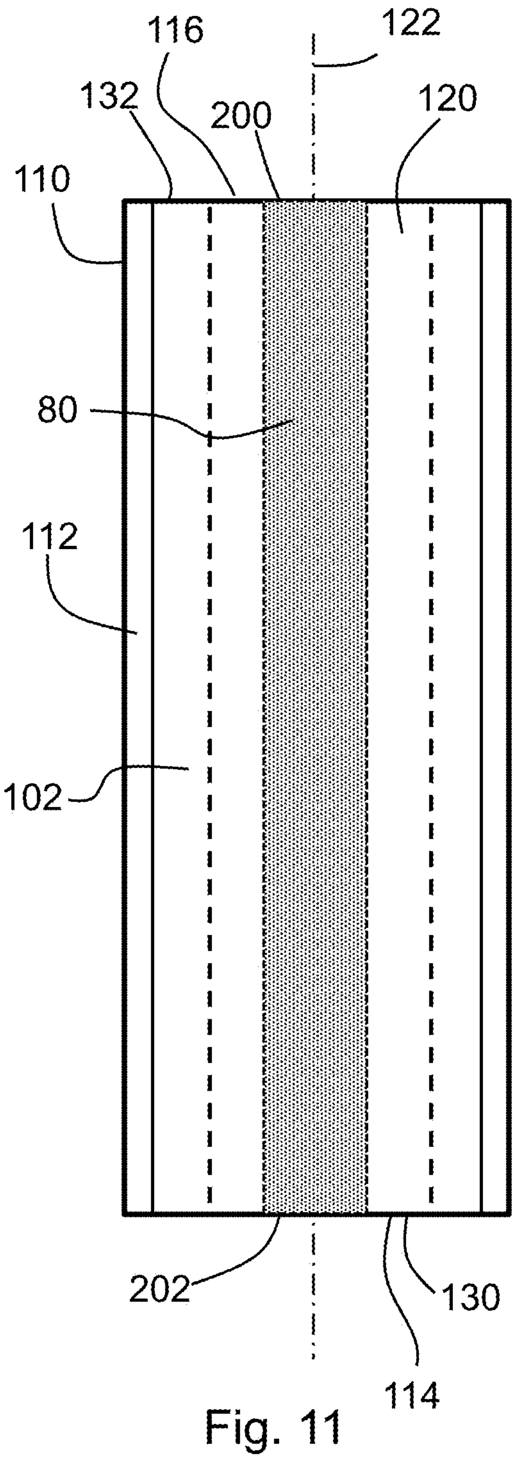

FIGS. 10, 11 illustrate the operation of an impurity indicator 200 of the fluid inspection apparatus 100 of the present disclosure. FIGS. 10, 11 show a side view of an example of the fluid inspection apparatus 100 of the present disclosure, as viewed through the viewing region 138. That is to say, FIGS. 10, 11 are a view of the second side 134 through which a user would/may look to inspect a region of the first side 134 in the vicinity of the impurity indicator 200 (as shown in FIG. 1). The flow path 120 and the impurity indicator 200 are shown in broken lines.

Initially, as shown in FIG. 10, the surface of the flow path 120 of the inspection section 102 is clean. However, as material (e.g., dissolved material and/or particulates) in the system 10 fluid passes over the material of the body element 110 which covers the impurity indicator 200, a proportion of the impurity is attracted towards the impurity indicator 200. That is to say, the impurity indicator 200 is configured to attract pollutants in the fluid, and so the pollutants adhere to the surface of the flow path 120 of the inspection section 102 adjacent to the impurity indicator 200.

For example, if the impurity indicator 200 is a magnet 202 and the fluid is water, some of the material dissolved in the water (for example calcium carbonate) is deposited on the surface of the flow path 120 adjacent to the impurity indicator 200 (as illustrated by the strip of deposit 80 in FIG. 11).

In another example, if the impurity indicator 200 is a magnet 202 and there are magnetic particles in the fluid, some of the particles are deposited on the surface of the flow path 120 adjacent to the impurity indicator 200 (as illustrated by the strip of the deposit 80 in FIG. 11).

Hence when, as illustrated in FIG. 1, a user looks through the viewing region 138 (e.g., the second side 136) to inspect a region of the first side 134 in the vicinity of the impurity indicator 200, the presence or absence of the strip of the deposit 80 will inform a user as to whether there are pollutants/impurities in the fluid, even if the fluid looks clean.

Alternatively, as illustrated in the examples of FIGS. 14, 15, 22, when a user looks through the viewing region 138 (e.g., the second side 136) to inspect a region of the first side 134 in the vicinity of the impurity indicator 200 and/or to inspect a region of the third side 148 in the vicinity of the second impurity indicator 2002, the presence or absence of the strip of the deposit 80 formed on the surface of the flow path 120 adjacent to the impurity indicator 200 and/or second impurity indicator 2002 will inform a user as to whether there are pollutants/impurities in the fluid, even if the fluid looks clean.

With this information a user can decide what action to take (for example determine the source of the pollutant/impurity and remove it).

The surface of the flow path 120 may be cleaned to remove the strip of the deposit 80.

Additionally, a user can see by looking at the fluid inspection apparatus 100 whether the fluid is "clean" or heavily polluted (for example if the fluid which should be transparent is translucent or opaque).

In examples in which a mesh element 500 is provided, the mesh element 500 may be configured such that a user is able to look through the viewing region 138 (e.g., the second side 136) through and/or past the mesh element 500, to inspect a region of the first side 134 in the vicinity of the impurity indicator 200, and hence view the presence or absence of the strip of the deposit 80 formed on the surface of the flow path 120 adjacent to the impurity indicator 200.

In examples in which a mesh element 500 is provided, the mesh element 500 may be configured such that a user is able to look through the viewing region 138 (e.g., the second side 136) through and/or past the mesh element 500, to inspect a region of the first side 134 in the vicinity of the impurity indicator 200 and/or to inspect a region of the third side 148 in the vicinity of the second impurity indicator 2002, and hence view the presence or absence of the strip of the deposit 80 formed on the surface of the flow path 120 adjacent to the impurity indicator 200 and/or second impurity indicator 2002.

For example, in an example in which the mesh element 500 comprises a coiled section, where the coil comprises a length of material wound in a joined sequence of rings, the rings may be spaced apart sufficiently so a user may look through gaps between the rings.

As illustrated in FIG. 22, there may be provided a flow diagnostic apparatus 600. The flow diagnostic apparatus 600 may form part of the fluid inspection apparatus 100. That is to say, there may be provided a system and/or kit comprising the fluid inspection apparatus 100 and the flow diagnostic apparatus 600. The flow diagnostic apparatus 600 may be provided separately to the fluid inspection apparatus 100 and may be configured for use with systems other than the fluid inspection apparatus 100 of the present disclosure.

Figure 23:
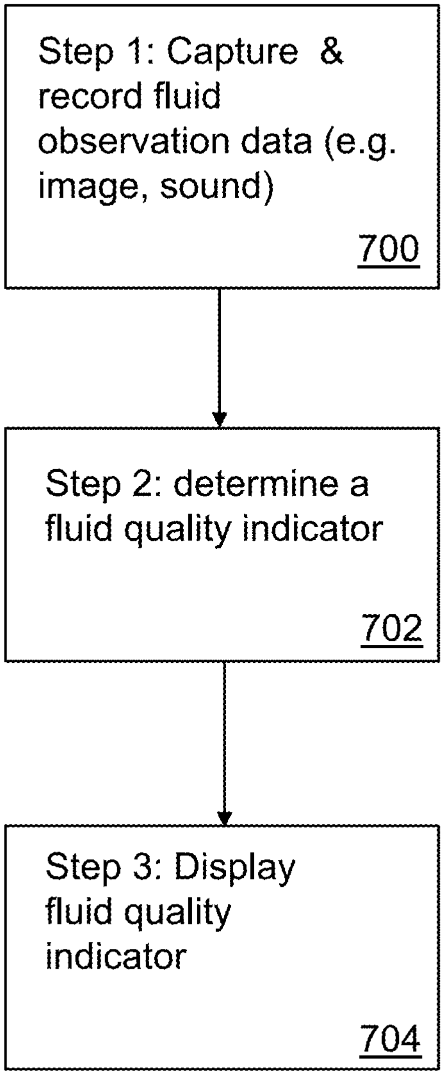
FIG. 23 defines a method of operation of the flow diagnostic apparatus.

As illustrated in FIG. 23, the flow diagnostic apparatus 600 may be operable in a first step 700 to capture and record fluid observation data comprising an image of the fluid in the inspection section 102 and/or sound of the fluid in inspection section 102. The flow diagnostic apparatus 600 may be operable in a second step 702 to determine a fluid quality indicator of the fluid in the inspection section 102 in dependence of the fluid observation data. The flow diagnostic apparatus 600 may be operable in a third step 704 to generate an output comprising the fluid quality indicator.

For example, the flow diagnostic apparatus 600 may comprise an electronic apparatus (for example a mobile device such as a mobile phone) with a processor 604 running an application configured to capture (e.g. record) and process (e.g. analyse) fluid observation data.

The electronic apparatus 600 may comprise a camera 602 for capturing an image, a plurality of images and/or video of fluid in the inspection section 102. In use, the camera 602 may be located at viewing position A (for example as illustrated in FIG. 22) and be directed to view the inspection section 102.

The electronic apparatus 600 may comprise a microphone 606 for capturing sound of the flow of fluid in the inspection section 102.

The flow diagnostic apparatus 600 may be operable to determine a fluid quality indicator of the fluid in the inspection section 102 in dependence of the captured image, images, video and/or sound fluid observation data. The fluid quality indicator may comprise consistency, debris identification, extent of pollution, viscosity, bubble volume and/or flow rate.

For example, the colour of the fluid (and hence the extent to which it may be polluted and/or the nature of the debris in the fluid) may be determined from the captured image, images, video. The application may comprise a database which correlates colour to a consistency, and is operable to compare the captured image, images and/or video using the database. The consistency (e.g. viscosity and/or amount of aeration) of the fluid may be determined from the captured sound.

In another example, the flow rate through the inspection section may be determined by determining the speed of particles/debris and/or bubbles in the inspection section 102 using the captured image, images and/or video.

The flow diagnostic apparatus 600 may be operable to generate an output comprising the fluid quality indicator (for example including the determinations described above made using the captured image, images, video and/or sound).

The flow diagnostic apparatus 600 may enable a user to quickly diagnose a flow system (for example a heating systems).

In examples where present, the light source 300 may further assist a user in detecting the present of a target impurity, for example by reflecting light off the target impurity and/or causing the impurity to glow, fluoresce or otherwise be highlighted in the fluid flow.

Hence there is provided an apparatus that enables a user to get an indication of the quality of a fluid in a system over a range of impurity concentrations while remaining isolated from, and not having to interact with, the fluid. The apparatus allows a user to visually inspect the fluid in a system without the need to extract a fluid sample, saving the user personal safety and disposal issues (for example if the fluid is hazardous).

The fluid inspection apparatus of the present disclosure allows a user to view the fluid as it flows through a system. Hence the presence of a large amount of pollutant will be self-evident, for example, because it will be easy to identify that the fluid looks different to how it looks in a clean and pure state. The impurity indicator enables a user to identify material which may otherwise be undetectable in the fluid flow by collecting a sample of the material for a user to observe.

The fluid inspection apparatus of the present disclosure requires no technical expertise from the user, since all the user needs to do is view the fluid and/or region adjacent the impurity indicator through the transparent material of the fluid inspection apparatus.

Illumination of the body element 110 of the fluid inspection apparatus 100 (for example using the light source 300) may assist with examining the fluid composition and/or the region adjacent the impurity indicator 200.

In examples in which the body element 110 comprises a phosphorescent pigment, this may further help to illuminate the fluid and/or the region adjacent the impurity indicator 200. It may also serve to guide and remind a user to inspect the fluid.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A fluid inspection apparatus configured to define an inspection section of a fluid flow passage of a system, wherein the fluid inspection apparatus comprises:

a body element having a wall that defines the inspection section, a flow inlet to the inspection section, and a flow outlet from the inspection section, the inspection section defining a flow path between the flow inlet and the flow outlet; and an impurity indicator configured to indicate the presence of an impurity in fluid flowing through the flow path, wherein the body element further comprises a first side and a second side, the body element defines a cavity along its length L in the first side, which extends at least part of a distance between the flow inlet and the flow outlet, the cavity being offset from and fluidly isolated from the flow path, and the impurity indicator being located in the cavity such that it is fluidly isolated from the flow path, the impurity indicator is a magnet, the second side defines a viewing region to inspect a surface of the inspection section adjacent to the impurity indicator, the inspection section defines a central flow axis, which extends along an extent of the body element, the body element defines a first end face spaced apart from a second end face along the extent of the body element, the flow inlet is provided on the first end face and the flow outlet is provided on the second end face such that the inspection section extends along the extent of the body element, and each of the first side and the second side extend from the first end face to the second end face.

2. A fluid inspection apparatus according to claim 1, wherein the first side is opposite the second side across the flow path.

3. A fluid inspection apparatus according to claim 1, wherein the first side is opposite a third side across the flow path and the second side extends between the first side and the third side.

4. A fluid inspection apparatus according to claim 3, wherein the body element defines a second cavity along its length L in the third side, which extends at least part of the distance between the flow inlet and the flow outlet, wherein the second cavity is offset from and fluidly isolated from the flow path, wherein a second impurity indicator is located in the second cavity such that it is fluidly isolated from the flow path, and wherein the second impurity indicator is a magnet.

5. A fluid inspection apparatus according to claim 1, wherein the second side of the body element comprises a transparent portion.

6. A fluid inspection apparatus according to claim 1, wherein the body element is transparent.

7. A fluid inspection apparatus according to claim 1, wherein the body element is formed from a material chosen from a list comprising polyurethane resin, epoxy resin, plastic, polymer, graphene, glass, acrylic, amorphous thermoplastic polymer, polyphthalamide, and silicone.

8. A fluid inspection apparatus according to claim 1, wherein the body element material comprises a phosphorescent pigment such that the body element is operable to emit light in response to absorbing light from a light source.

9. A fluid inspection apparatus according to claim 1, wherein the body element further comprises a light source mounted on and/or embedded in the body element, and wherein the fluid inspection apparatus further comprises a power source to operate the light source.

10. A fluid inspection apparatus according to claim 9, wherein the power source comprises a thermoelectric generator operable to generate electricity using heat energy extracted from the fluid passing through the inspection section.

11. A fluid inspection apparatus according to claim 1, wherein the impurity indicator is configured to indicate the presence of a dissolved mineral in the fluid.

12. A fluid inspection apparatus according to claim 1, wherein the first side defines a first flat outer surface and the cavity is provided as a recess on the first flat outer surface.

13. A fluid inspection apparatus according to claim 1, wherein the first side defines a first flat outer surface and the cavity is provided beneath and covered by material which defines the first flat outer surface.

14. A fluid inspection apparatus according to claim 1, wherein the inspection section has a constant diameter D along its length between the flow inlet and the flow outlet.

15. A fluid inspection apparatus according to claim 1, wherein the inspection section comprises a transparent sheath, which extends along at least part of the length L of the inspection section, wherein the sheath defines the inspection section flow path and the sheath is bounded by the body element, and wherein the sheath includes a different material to the body element.

16. A fluid inspection apparatus according to claim 1, wherein the inspection section defines an unobstructed flow path between the flow inlet and the flow outlet.

17. A fluid inspection apparatus according to claim 1, wherein a magnetic mesh element is provided in the inspection section and extends at least part of the distance between the flow inlet and the flow outlet.

18. A fluid inspection apparatus according to claim 1, further comprising a flow diagnostic apparatus operable to:

(a) capture and record fluid observation data comprising an image of the fluid in the inspection section and/or sound of the fluid in inspection section;

(b) determine a fluid quality indicator of the fluid in the inspection section based on the fluid observation data; and (c) generate an output comprising the fluid quality indicator.

19. A system comprising the fluid flow passage defined at least in part by the fluid inspection apparatus according to claim 1, wherein the second side of the body element is positioned between a viewing position A and the inspection section, and wherein the system forms at least part of: a boiler heating circuit, a heat pump flow and return circuit, an electric boiler heating circuit, a cold water main supply, a hot water outlet, an air conditioning unit, an air conditioning circuit, an underfloor heating system, an oil filter, a water pump circuit, a fuel system, or any combination thereof.

* * * * *